United States Patent
Alexander et al.

(10) Patent No.: US 7,939,175 B2
(45) Date of Patent: *May 10, 2011

(54) NON-HALOGENATED RUBBER COMPOUNDS FOR USE IN CONVEYOR BELTS

(75) Inventors: Kenneth Michael Alexander, Dublin, OH (US); David Joseph Maguire, Hudson, OH (US)

(73) Assignee: Veyance Technologies, Inc., Fairlawn, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,723

(22) Filed: Oct. 30, 2009

(65) Prior Publication Data

US 2010/0044189 A1  Feb. 25, 2010

Related U.S. Application Data

(63) Continuation-in-part of application No. 11/740,028, filed on Apr. 25, 2007.

(51) Int. Cl.
*B32B 25/08* (2006.01)
*C08K 5/521* (2006.01)
*C08K 3/22* (2006.01)
*B65G 15/34* (2006.01)
*C08K 5/523* (2006.01)

(52) U.S. Cl. ........ 428/493; 528/492; 524/140; 524/141; 524/437; 198/844.1; 198/846

(58) Field of Classification Search .......... 524/437, 524/140–141; 523/103; 428/492–493; 198/844.1, 198/846
See application file for complete search history.

(56) References Cited

U.S. PATENT DOCUMENTS

| | | | | |
|---|---|---|---|---|
| 3,963,665 A | | 6/1976 | Boyer | 524/308 |
| 4,468,496 A | * | 8/1984 | Takeuchi et al. | 525/233 |
| 4,705,161 A | | 11/1987 | Gozdiff | 198/847 |
| 5,119,927 A | | 6/1992 | Bruggemann | |

(Continued)

FOREIGN PATENT DOCUMENTS

GB  1395780 A  *  5/1975

(Continued)

OTHER PUBLICATIONS

Machine translated English equivalent of JP03043432A.*

(Continued)

*Primary Examiner* — Milton I Cano
*Assistant Examiner* — Brieann R Fink
(74) *Attorney, Agent, or Firm* — Alvin T. Rockhill; Kathleen K. Bowen

(57) ABSTRACT

A non-halogenated rubber compound is provided for use in conveyor belts, particularly those used in underground mining. The non-halogenated rubber compound is fire-resistant in accordance with MSHA standards and produces acceptable levels of toxicity and smoke upon burning. Such non-halogenated rubber compound includes a blend of rubbery polymers in combination with aluminum trihydrate, which is a fire retardant, and optionally a phosphate plasticizer, which can provide the rubber compound with a more desirable workability. The blend of rubbery polymers is composed of natural rubber and butadiene rubber, and optionally styrene-butadiene rubber, such blend being present in a total amount of 100 phr. In one embodiment, the aluminum trihydrate is present in an amount of about 30 phr to about 150 phr. In another embodiment, the phosphate plasticizer is present in an amount of about 10 phr to about 60 phr.

3 Claims, 1 Drawing Sheet

U.S. PATENT DOCUMENTS

| | | | |
|---|---|---|---|
| 5,340,867 A * | 8/1994 | Yagawa et al. | 524/80 |
| 5,780,531 A * | 7/1998 | Scholl | 523/213 |
| 6,737,478 B2 * | 5/2004 | Obrecht et al. | 525/133 |
| 6,944,210 B1 | 9/2005 | Michel et al. | 375/150 |
| 6,994,210 B2 * | 2/2006 | Kerwel et al. | 198/847 |
| 2003/0166759 A1 * | 9/2003 | Kikuchi | 524/437 |
| 2004/0140180 A1 * | 7/2004 | Kerwel et al. | 198/847 |

FOREIGN PATENT DOCUMENTS

| | | | |
|---|---|---|---|
| JP | 57070136 A * | 4/1982 | |
| JP | 03043432 A * | 2/1991 | |
| JP | 2006176659 A | 7/2006 | |
| KR | 2000046918 A * | 7/2000 | |

OTHER PUBLICATIONS

JPO abstract of JP 57070136.*

CAPlus Abstract for JP 03043432, AN 1991:249140, 2 pages, Feb. 1991.*

Derwent Abstract for KR 2000046918, AN 2002:426773, 2 pages, Jun. 2002.*

Machine translated English equivalent of KR 2000046918, 8 pages, Jul. 2000.*

* cited by examiner

NON-HALOGENATED RUBBER COMPOUNDS FOR USE IN CONVEYOR BELTS

This is a continuation-in-part of U.S. patent application Ser. No. 11/740,028, filed on Apr. 25, 2007. The teachings of U.S. patent application Ser. No. 11/740,028 are incorporated by reference in their entirety.

BACKGROUND OF THE INVENTION

Due to stringent fire prevention standards for underground mining operations promulgated and enforced by the United States Department of Labor's Mine Safety and Health Administration ("MSHA"), conveyor belts for underground mining must be suitably fire-resistant. To that end, halogenated compositions, e.g., chlorinated compositions, are known to be useful in rubber compounds for providing conveyor belts with fire-resistance that meets or exceeds MSHA standards. However, while halogenated compositions may be suitable fire retardants, such compositions disadvantageously release toxic, caustic, and/or corrosive fumes and/or undesirable levels of smoke upon burning. Those by-products can be particularly dangerous and potentially lethal to miners in the relatively closed confines of an underground mine in the event that halogenated compositions burn in a mine fire. Thus, in addition to be being fire resistant it would be highly beneficial for rubber formulations used in manufacturing conveyor belts for underground mining operations to generate less harmful fumes and smoke upon burning than is produced in cases where conventional halogenated rubber compounds are utilized in making the conveyor belt. To that end, alternative rubber compounds having the physical and mechanical attributes required for use in making conveyor belts are currently in demand and would fulfill a long felt need in the industry.

Accordingly, it would be desirable to provide a suitable non-halogenated rubber compound for use in conveyor belts for underground mining, such non-halogenated rubber compound being fire-resistant in accordance with MSHA standards and producing acceptable levels of toxicity and smoke upon burning.

SUMMARY OF THE INVENTION

In accordance with an embodiment of the present invention, a non-halogenated rubber compound is provided for use in conveyor belts, particularly those used in underground mining. To that end, the non-halogenated rubber compound is fire-resistant in accordance with MSHA standards and produces acceptable levels of toxicity and smoke upon burning. Such non-halogenated rubber compound includes a blend of rubbery polymers in combination with aluminum trihydrate, which is a fire retardant, and optionally a phosphate plasticizer, which can provide the rubber compound with a more desirable workability. The blend of rubbery polymers is composed of natural rubber and butadiene rubber, and optionally styrene-butadiene rubber, such blend being present in a total amount of 100 parts per hundred rubber (phr).

The aluminum trihydrate, in one embodiment, is present in an amount of about 30 phr to about 150 phr. In another embodiment, the phosphate plasticizer is present in an amount of about 10 phr to about 60 phr. The non-halogenated rubber compound may further include other additional ingredients to provide the non-halogenated rubber compound with other various desirable characteristics.

In accordance with another embodiment of the present invention, a fire-resistant conveyor belt is provided which includes a first and second outer cover layer, with at least one of the first or second outer cover layers defining the non-halogenated rubber compound. The fire-resistant conveyor belt further includes at least one reinforcement layer, e.g., a textile or metal reinforcement layer, that is situated between the first cover layer and the second cover layer. The reinforcement layer can further include outer first and second skim layers situated on opposing surfaces thereof. In one embodiment, at least one skim layer defines the non-halogenated rubber compound. As a further option, at least one skim layer defines the non-halogenated rubber compound while one or more cover layers may define conventional rubber compounds known in the art.

By virtue of the foregoing, there is thus provided a non-halogenated rubber compound for use in conveyor belts for underground mining, such non-halogenated rubber compound being fire-resistant in accordance with MSHA standards and further producing acceptable levels of toxicity and smoke upon burning.

BRIEF DESCRIPTION OF THE DRAWING

The accompanying drawing, which is incorporated in and constitutes a part of this specification, illustrates an embodiment of the invention and, together with the general description of the invention given above, and detailed description given below, serves to explain the invention.

DETAILED DESCRIPTION

Figure 1:
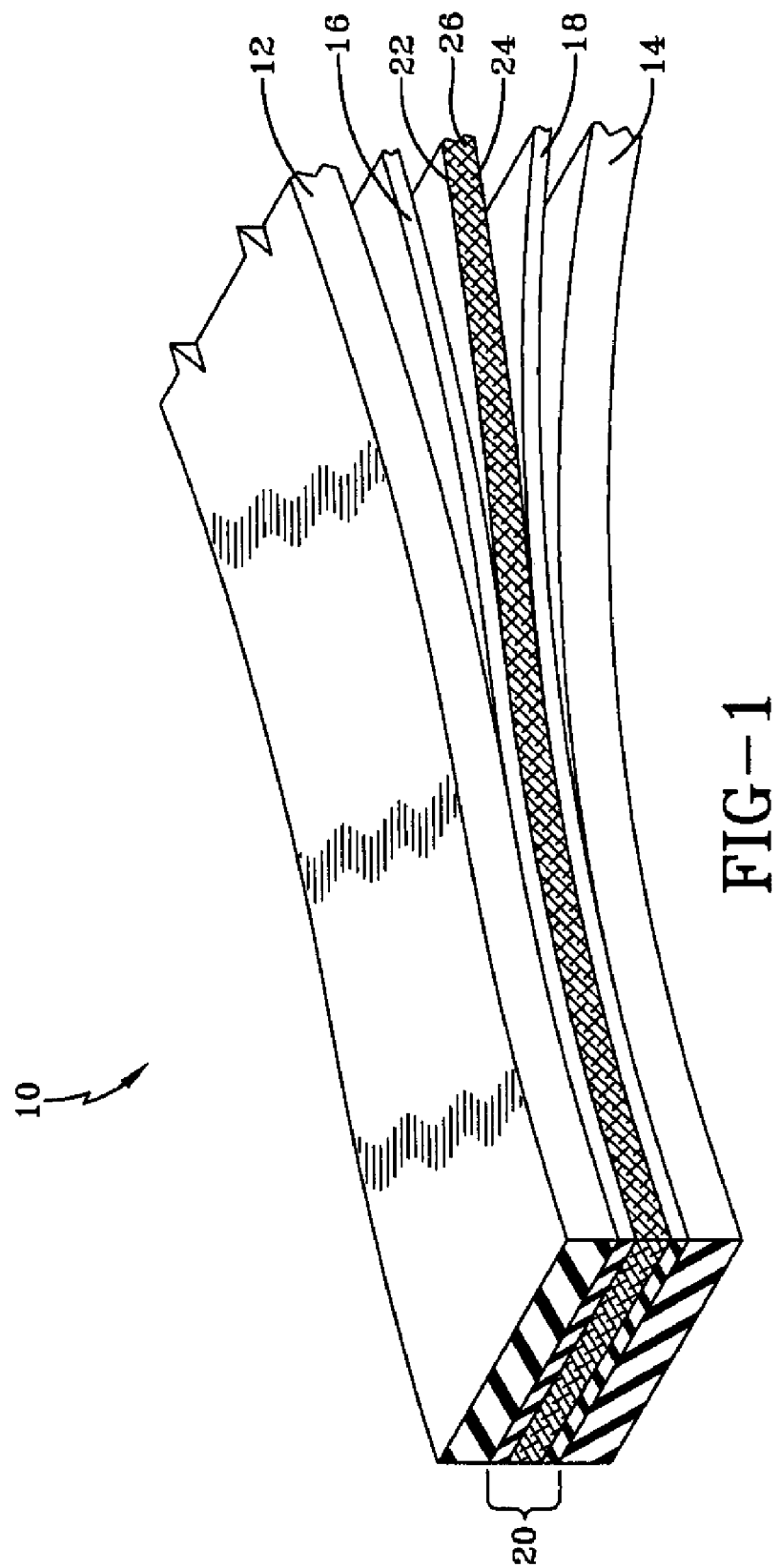
FIG. 1 is a partial perspective view of a fire-resistant conveyor belt including a non-halogenated rubber compound in accordance with the present invention.

In accordance with an embodiment of the invention, a non-halogenated rubber compound is provided for use in conveyor belts 10, particularly those used in underground mining. The non-halogenated rubber compound includes a blend of rubbery polymers in combination with aluminum trihydrate, which is a fire retardant, and optionally a phosphate plasticizer, which can provide the rubber compound with a more desirable workability. The blend of rubbery polymers is composed of natural rubber and butadiene rubber, and optionally styrene-butadiene rubber, such blend being present in a total amount of 100 parts per hundred rubber (phr).

In the blend of rubbery polymers, the natural rubber may be present in an amount of about 5 phr to about 70 phr, the butadiene rubber may be present in an amount of about 20 phr to about 70 phr, and the optional styrene-butadiene rubber may be present in an amount of about 0 phr to about 90 phr. In one embodiment, the blend of rubbery polymers is composed of natural rubber present in an amount of about 5 phr to about 35 phr, butadiene rubber present in an amount of about 20 phr to about 50 phr, and styrene-butadiene rubber present in an amount of about 40 phr to about 90 phr. In another embodiment, the blend of rubbery polymers is composed of natural rubber present in an amount of about 5 phr to about 15 phr, butadiene rubber present in an amount of about 30 phr to about 40 phr, and styrene-butadiene rubber present in an amount of about 50 phr to about 70 phr. When the blend of rubbery polymers is composed of natural rubber and butadiene rubber alone, the natural rubber is present in an amount of about 30 phr to about 70 phr and the butadiene rubber is present in an amount of about 30 phr to about 70 phr.

The aluminum trihydrate may optionally be supplemented by adding further halogen-free compounds, such as magnesium carbonate, zinc borate, magnesium hydroxide, and phosphorus or nitrogen containing chemicals. The aluminum trihydrate, in one embodiment, is present in an amount of about 30 phr to about 150 phr. In another embodiment, the aluminum trihydrate is present in an amount of about 50 phr to about 150 phr. In another embodiment, the aluminum trihydrate is present in an amount of about 65 phr to about 135 phr. In yet another embodiment, the aluminum trihydrate is present in an amount of about 85 phr to about 125 phr.

The phosphate plasticizer can include a phosphate ester or disphenylcresyl phosphate or tricresyl phosphate, for example. The phosphate ester may include 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate, isopropylated triphenyl phosphate, or mixtures thereof. In one embodiment, the phosphate plasticizer is present in an amount of about 10 phr to about 60 phr. In another embodiment, the phosphate plasticizer is present in an amount of about 10 phr to about 50 phr. In another embodiment, the phosphate plasticizer is present in an amount of about 20 phr to about 40 phr. In yet another embodiment, the phosphate plasticizer is present in an amount of about 25 phr to about 35 phr.

The non-halogenated rubber compound may further include other additional ingredients to provide the non-halogenated rubber compound with various desirable characteristics. Those other additives may be added as desired or as necessary and include carbon black filler and/or silica filler, as well as curing agents, activators, retarders and accelerators, rubber processing oils and agents, resins including tackifying resins, fatty acids, zinc oxides, waxes, antidegradants, antiozonants, and peptizing agents, for example, These other additives, depending on the intended use of the rubber compound, are selected and used in conventional amounts. The non-halogenated rubber compound will typically contain less than 5 phr of nitrile group-containing polymers, such as nitrile rubbers, and will preferably be void of nitrile group containing elastomers. The non-halogenated rubber compound will also typically be void of red phosphorus.

The non-halogenated rubber compound of the present invention may be compounded by methods known in the rubber compounding art as further explained below in conjunction with the examples. The non-halogenated rubber compound is fire-resistant in accordance with MSHA standards and further produces acceptable levels of toxicity and smoke upon burning. Such fire-resistant non-halogenated rubber compounds are used in conveyor belts 10, particularly those in underground coal mining, which are further discussed.

With reference to FIG. 1, the conveyor belt 10 includes first and second outer cover layers 12 and 14, which are composed of, i.e., define, the non-halogenated rubber compound. Alternatively, only one of the first or second outer cover layers 12, 14, defines the non-halogenated rubber compound. Such first and second outer cover layers 12, 14 are attached to outer first and second skim layers 16 and 18, respectively, of reinforcement layer 20, which is situated between the first and second outer cover layers 12, 14. Outer first and second skim layers 16, 18, coat opposing surfaces 22 and 24 of textile material 26 which together define reinforcement layer 20. The textile material may be a polyester/polyamide fabric, a polyester/polyester fabric, or a polyamide/polyamide fabric. Other materials, such as metals, may be substituted for the textile material 26. As known by those having ordinary skill in the art, multiple reinforcement layers 20 may be included with skim layers 16, 18, respectively, on opposing surfaces 22, 24 thereof.

Each skim layer 16, 18 further defines the non-halogenated rubber compound of the present invention. Alternatively, one of the skim layers 12, 14 may define the non-halogenated rubber compound or one or more skim layers 16, 18 can define a conventional rubber compound known in the art. As a further option, the skim layers 16, 18 may define the non-halogenated rubber compound while the cover layers 12, 14 may define conventional rubber compounds known in the art. Other variations should be understood by a person having ordinary skill in the art.

The conveyor belt 10, which utilizes the non-halogenated rubber compound, may be assembled initially by applying the first and second skim layers 16, 18 to the opposing surfaces 22, 24 of the textile material (or metal) 26 of reinforcement layer 20 by calendaring as known in the art. Next, the first and second outer cover layers 12, 14 may be simultaneously (or sequentially) applied to the reinforcement layer 20 by calendering the non-halogenated rubber compound onto the corresponding first and second skim layers 16, 18. The resulting product is an unfinished, i.e., uncured, conveyor belt. Once assembled, the conveyor belt is then guided through a vulcanization press. The vulcanized conveyor belt 10 may then be cut to desired lengths for use in underground mining facilities.

Non-limiting examples of the non-halogenated rubber compound in accordance with the description are disclosed below. These examples are merely for the purpose of illustration and are not to be regarded as limiting the scope of the invention or the manner in which it can be practiced. Other examples will be appreciated by a person having ordinary skill in the art.

| Non-Halogenated Rubber Compound (Examples 1-6) | | | | | | |
|---|---|---|---|---|---|---|
| | Compound Number: | | | | | |
| MATERIAL | 1 PHR | 2 PHR | 3 PHR | 4 PHR | 5 PHR | 6 PHR |
| Non-Productive Stage (NP) | | | | | | |
| Styrene-Butadiene Rubber | 54.55 | 54.55 | 54.55 | 54.55 | 54.55 | 54.55 |
| Butadiene Rubber | 36.36 | 36.36 | 36.36 | 36.36 | 36.36 | 36.36 |
| Natural Rubber | 9.09 | 9.09 | 9.09 | 9.09 | 9.09 | 9.09 |
| Carbon black | 36.36 | 36.36 | 36.36 | 36.36 | 36.36 | 36.36 |

-continued

Non-Halogenated Rubber Compound (Examples 1-6)

| | Compound Number: | | | | | |
|---|---|---|---|---|---|---|
| | 1 | 2 | 3 | 4 | 5 | 6 |
| MATERIAL | PHR | PHR | PHR | PHR | PHR | PHR |
| Silica filler | 4.55 | 4.55 | 4.55 | 4.55 | 18.18 | 18.18 |
| Aluminum trihydrate (ATH)[1] | 68.18 | 90.91 | 113.64 | 90.91 | 90.91 | 113.64 |
| Phosphate ester Plasticizer[2] | 27.27 | 27.27 | 27.27 | 27.27 | 27.27 | 27.27 |
| Zinc borate | 0.00 | 0.00 | 0.00 | 13.64 | 13.64 | 13.64 |
| Processing agent[3] | 1.82 | 1.82 | 1.82 | 1.82 | 1.82 | 1.82 |
| Stearic acid | 1.82 | 1.82 | 1.82 | 1.82 | 1.82 | 1.82 |
| Antiozonant[4] | 0.91 | 0.91 | 0.91 | 0.91 | 0.91 | 0.91 |
| NP total: | 240.91 | 263.64 | 286.37 | 277.28 | 290.91 | 313.64 |
| Productive Stage | | | | | | |
| Antioxidant[5] | 0.50 | 0.50 | 0.50 | 0.50 | 0.50 | 0.50 |
| Zinc oxide | 2.73 | 2.73 | 2.73 | 2.73 | 2.73 | 2.73 |
| Sulfur | 1.64 | 1.64 | 1.64 | 1.64 | 1.64 | 1.64 |
| Accelerator[6] | 1.32 | 1.32 | 1.32 | 1.32 | 1.32 | 1.32 |
| Accelerator[7] | 0.27 | 0.27 | 0.27 | 0.27 | 0.27 | 0.27 |
| Total | 247.37 | 270.10 | 292.83 | 283.74 | 297.37 | 320.10 |

[1]Micral 632 available from J. M. Huber Corp. of Atlanta, GA
[2]Santicizer 141 available from Chemcentral Corp. of Bedford Park, IL
[3]Promix 400 available from Flow Polymers of Cleveland, OH
[4]Santoflex 6PPD available from Flexsys America of Akron, OH
[5]Goodrite Resin D available from Emerald Polymer of Akron, OH
[6]Santocure CBS available from Flexsys America of Akron, OH
[7]Perkacit TMTM available from Flexsys America of Akron, OH In preparing each of the non-halogenated rubber compounds, the non-productive stage components, except for the phosphate ester plasticizer, were added to a Banbury mixer (speed #3) at an initial temperature of about 72° F. Those components were mixed for about one minute until a temperature of about 250° F. was reached, after which, the phosphate ester plasticizer was added. The components were further mixed for about 3 to 3.5 minutes until the temperature reached about 280° F. The mixture was discharged from the mixer at about 300° F. then the stock was passed through the mill and allowed to cool prior to mixing the productive stage.

For the productive mixing stage, half the non-productive mixture was added to a Banbury mixer (speed #2) at an initial temperature of about 72° F., followed by the productive stage components, then the remainder of the non-productive mixture. The components were mixed for about one and a half minutes until a temperature of about 220° F. was reached, then the stock was passed through the mill and allowed to cool. The aluminum trihydrate may optionally be included in the productive mix rather than the non-productive mix.

Each of the non-halogenated rubber compounds were fully characterized using, for example, standard Mooney scorch testing, MSHA 2G flame testing, and AS 1334.10 flame testing. The results are listed in Table 1 below.

TABLE 1

| | Compound Number: | | | | | |
|---|---|---|---|---|---|---|
| | 1 | 2 | 3 | 4 | 5 | 6 |
| Std Cure 20/305 F. | | | | | | |
| 100% Mod (Mpa) | 1.7 | 1.7 | 1.7 | 2.0 | 2.0 | 1.9 |
| 300% Mod (Mpa) | 4.7 | 4.5 | 4.6 | 5.2 | 4.1 | 3.8 |
| Tensile (Mpa) | 12.5 | 10.6 | 9.4 | 9.2 | 10.1 | 9.6 |
| Elongation (%) | 567 | 525 | 584 | 541 | 602 | 614 |
| Durometer Shore A | 58 | 59 | 59 | 60 | 60 | 61 |
| Tear C (kN/m) | 31.3 | 28.9 | 29.0 | 31.1 | 31.2 | 30.5 |
| DIN Abrasion (cu · mm) | 253 | 321 | 321 | 299 | 328 | 324 |
| 150 C. ODR | | | | | | |
| Min | 8.97 | 9.56 | 9.78 | 10.17 | 11.99 | 14.19 |
| Trise | 5.69 | 5.36 | 5.25 | 6.17 | 6.22 | 6.17 |
| T25 | 6.56 | 6.17 | 6.11 | 7.15 | 7.60 | 7.64 |
| T90 | 7.85 | 7.24 | 7.13 | 8.44 | 11.30 | 11.77 |
| S90 | 36.91 | 37.97 | 38.51 | 41.33 | 36.73 | 39.62 |
| Amount | 31.04 | 31.56 | 31.93 | 34.63 | 27.49 | 28.26 |
| Rate | 15.73 | 19.11 | 20.34 | 17.50 | 4.84 | 4.45 |
| 30 min Mooney scorch | | | | | | |
| Initial viscosity | 33.0 | 35.1 | 40.4 | 44.4 | 46.3 | 55.7 |
| Min viscosity | 23.0 | 25.5 | 27.2 | 28.6 | 33.8 | 40.6 |
| 5 min viscosity | 25.8 | 28.5 | 30.3 | 32.2 | 37.4 | 44.4 |
| Rise | None | None | None | None | None | None |
| MSHA 2G flame test, ½" × ½" × 6" all-rubber samples flame duration (sec.) | | | | | | |
| sample 1 | 22 | 12 | 5 | 16 | 5 | 3 |
| sample 2 | 22 | 13 | 7 | 10 | 3 | 4 |
| sample 3 | 18 | 9 | 12 | 18 | 3 | 4 |
| sample 4 | 27 | 7 | 8 | 9 | 10 | 3 |
| average | 22.3 | 10.3 | 8.0 | 13.3 | 5.3 | 3.5 |
| afterglow (sec.) | | | | | | |
| average | 0 | 0 | 0 | 0 | 0 | 0 |

TABLE 1-continued

| | Compound Number: | | | | | |
|---|---|---|---|---|---|---|
| | 1 | 2 | 3 | 4 | 5 | 6 |
| AS 1334.10 flame test, ½" × ½" × 6" all-rubber samples flame duration (sec.) | | | | | | |
| sample 1 | 190 | 107 | 55 | 115 | 81 | 43 |
| sample 2 | 197 | 117 | 114 | 85 | 101 | 59 |
| sample 3 | 256 | 126 | 100 | 110 | 100 | 52 |
| sample 4 | 306 | 114 | 43 | 66 | 93 | 35 |
| average | 237.3 | 116.0 | 78.0 | 94.0 | 93.8 | 47.3 |
| afterglow (sec.) | | | | | | |
| average | 0 | 0 | 0 | 0 | 0 | 0 |

Based upon the above results, example 6 of the non-halogenated rubber compounds was selected for further testing against a control sample, i.e., a halogenated rubber compound. The halogenated component in the control sample was liquid chlorinated paraffin. The selection of example 6 was based upon the results of the flame-out time in the standard MSHA 2G flame test insofar as those results were very similar to that of the control sample.

The formulation for the control sample is set forth below, which is based on 100 parts of rubber hydrocarbon (RHC). The control sample was prepared in accordance with the mixing steps discussed above with respect to examples 1-6.

| Halogenated Control Sample | |
|---|---|
| Control Sample: MATERIAL | RHC |
| Non-Productive Stage (NP) | |
| Styrene-Butadiene Rubber, extended with 37.5 phr oil | 65.10 |
| Butadiene Rubber | 43.40 |
| Natural Rubber | 9.26 |
| Carbon black | 87.75 |
| Silica filler | 5.00 |
| Aluminum trihydrate (ATH)[1] | 17.82 |
| Liquid chlorinated paraffin[2] | 51.00 |
| Processing agent[3] | 2.00 |
| Calcium oxide (80% in light naphthenic oil) | 2.72 |
| Stearic acid | 2.00 |
| Whole tire reclaim rubber | 6.03 |
| Antiozonant[4] | 0.55 |
| NP | 292.63 |
| Productive Stage | |
| Antioxidant[5] | 0.55 |
| Zinc oxide | 2.00 |
| Sulfur | 1.80 |
| Accelerator[6] | 1.45 |
| Accelerator[7] | 0.30 |
| Total | 298.73 |

[1]Micral 632 available from J. M. Huber Corp. of Atlanta, GA
[2]Paroil 5510 available from Dover Chemical Co. of Dover, OH
[3]Promix 400 available from Flow Polymers of Cleveland, OH
[4]Santoflex 6PPD available from Flexsys America of Akron, OH
[5]Goodrite Resin D available from Flexsys America of Akron, OH
[6]Santocure CBS available from Flexsys America of Akron, OH
[7]Perkacit TMTM available from Flexsys America of Akron, OH Non-halogenated example 6 and the halogenated control sample were used to prepare outer cover layers and skim layers for conveyor belt samples which included two plies of 200 PIW polyester/polyamide fabric. Each ply included outer first and second skim layers on opposing surfaces thereof. The conveyor belt samples were about 0.35" inches thick. The belt samples were fully characterized using, for example, standard smoke density tests, flame tests, and burn tests to evaluate smoke density, toxicity, and flame resistance of the rubber compounds. The tests and results are set forth below.

| Smoke Density Test per ASTM E662 Smoke Density Test per ASTM E662 Specific Optical Density (Ds) Maximum Specific Optical Density (Dm) Maximum Specific Optical Density Corrected (Dm Corr.) | | | | | |
|---|---|---|---|---|---|
| Compound | Ds @ 90 sec. | Ds @ 4 min. | Dm | Dm Corr. | Time |
| Flaming Mode, average of 3 tests | | | | | |
| Control Sample | 65 | 195 | 405 | 364 | 13:40 |
| Example 6 | 4 | 28 | 290 | 281 | 13:28 |
| Non-Flaming Mode, average of 3 tests | | | | | |
| Control Sample | 2 | 73 | 418 | 408 | 16:58 |
| Example 6 | 1 | 15 | 362 | 355 | 19:04 |

ASTM E662 "Standard Test Method for Specific Optical Density of Smoke Generated by Solid Materials" was utilized to determine smoke density (Ds). Accordingly, the smoke density test was performed per ASTM E662 standards. To that end, a 7.6-cm (3-inch) square test sample was placed vertically in a smoke chamber with a heat source of 2.5 W/cm$^2$. The test was performed both with and without a flame to determine which resulted in greater smoke density. The test was performed for a maximum of 20 minutes, with optical smoke density measurements taken at the specified intervals to determine the maximum density.

As indicated in the above table, non-halogenated example 6 provided a lower smoke density in both the flaming and non-flaming modes when compared to the halogenated control sample.

| Smoke Density from Cone Calorimeter Test Smoke Density from Cone Calorimeter test Values are Specific Extinction Area (m$^2$/kg) | | |
|---|---|---|
| Sample ID: | Control Sample | Example 6 |
| Peak | 4037 | 1267 |
| Average from Ignition to Ignition plus: | | |
| 3 minutes | 1091 | 526 |
| 4 minutes | 1188 | 475 |
| 5 minutes | 1536 | 448 |

The cone calorimeter test was similarly used to measure smoke density. To that end, the surface of each test specimen was exposed to a constant level of heat irradiance, within the range 0-100 kW/m$^2$, from a conical heater. Smoke production was assessed by measuring attenuation of a laser beam by smoke in an exhaust duct. The attenuation was related to the sample mass loss, resulting in a measure of smoke density called specific extinction area [m$^2$/kg].

Similar to the results for the smoke density test per ASTM E662, the non-halogenated example 6 provided a lower smoke density by way of the cone calorimeter test when compared to the halogenated control sample.

| | Toxic Gas Generation per BSS 7239 Average Concentration (ppm) | | | | | |
|---|---|---|---|---|---|---|
| Compound | Hydrogen Cyanide (HCN) | Carbon Monoxide (CO) | Nitrous Oxides (NOx) | Sulfur Dioxide (SO$_2$) | Hydrogen Fluoride (HF) | Hydrogen Chloride (HCl) |
| Flaming Mode, avg of 3 tests | | | | | | |
| Control Sample | <2 | 500 | 5 | 15 | <1.5 | 500 |
| Example 6 | 2 | 200 | 10 | 13 | <1.5 | 25 |
| Non-Flaming Mode, avg 3 tests | | | | | | |
| Control Sample | <2 | 50 | <2 | <1 | <1.5 | 500 |
| Example 6 | <2 | 10 | <2 | <1 | <1.5 | 6 |

BSS 7239, "Test Method for Toxic Gas Generation by Materials on Combustion," was developed by Boeing Company. The test uses a smoke density chamber for sample combustion to determine the levels of toxic gases released by a sample during combustion under thermal exposure conditions. Accordingly, the toxic gas generation test was performed per BSS 7239 standards.

As indicated in the above table, non-halogenated example 6 generated less toxic carbon monoxide and hydrogen chloride gas in both the flaming and non-flaming modes when compared to the halogenated control sample.

The flame test was performed per ISO 340 standards. In the flame test, each sample was 1" by 8" inches and held at a 45° angle above a vertical burner with a 150-180 mm flame. Each sample was ignited for 45 sec., with an air current being applied 60 sec. after the flame was removed. All tests were conducted with covers-on.

Like the finger burn test above, the halogenated control sample, on average, flamed longer than the non-halogenated example 6.

| | AS 1334.10 "Finger Burn" test | | | | | | | | | |
|---|---|---|---|---|---|---|---|---|---|---|
| | Sample #1 | | Sample #2 | | Sample #3 | | Sample #4 | | Average | |
| Compound | Flame out (Sec.) | Afterglow (Sec.) | Flame out (Sec.) | Afterglow (Sec.) | Flame out (Sec.) | Afterglow (Sec.) | Flame out (Sec.) | Afterglow (Sec.) | Flame out (Sec.) | Afterglow (Sec.) | Sample Thickness |
| Control Sample | 75 | 0 | 72 | 0 | 92 | 0 | 160 | 0 | 100 | 0 | .348" |
| Example 6 | 25 | 0 | 57 | 0 | 20 | 0 | 63 | 0 | 41 | 0 | .355" |

The finger burn test was performed per AS 1334.10 standards. In the finger burn test, each sample was ½" by 6" and held horizontally above a vertical burner with a 75-100 mm flame. Each sample was ignited for 60 sec., with an air current being applied at the moment the flame went out. All tests were conducted on samples of full thickness (with covers intact).

Based upon the results of the finger burn test, the halogenated control sample, on average, flamed twice as long as non-halogenated example 6.

| Limiting Oxygen Index test, per ISO 4589 | |
|---|---|
| Compound | Oxygen Index |
| Control Sample | 25.4 |
| Example 6 | 32.5 |

| | ISO 340 flame test | | | | | | | | | |
|---|---|---|---|---|---|---|---|---|---|---|
| | Sample #1 | | Sample #2 | | Sample #3 | | Sample #4 | | Average | |
| Compound | Flame out (Sec.) | Afterglow (Sec.) | Flame out (Sec.) | Afterglow (Sec.) | Flame out (Sec.) | Afterglow (Sec.) | Flame out (Sec.) | Afterglow (Sec.) | Flame out (Sec.) | Afterglow (Sec.) | Sample Thickness |
| Control Sample | 134 | 1 | 74 | 0 | 75 | 0 | 64 | 0 | 87 | 0 | .348" |
| Example 6 | 53 | 0 | 53 | 0 | 71 | 0 | 54 | 0 | 58 | 0 | .355" |

The limiting oxygen index (LOI) test was performed per ISO 4589 standards. Each sample was 13 mm×20 mm×150 mm cut from molded rubber.

As indicated in the above table, non-halogenated example 6 had a greater oxygen index, i.e., had greater flame-retarding properties, when compared to the halogenated control sample.

Accordingly, non-halogenated example 6 performed better than the halogenated control sample in each of the above tests. Thus, suitable non-halogenated rubber compounds are provided for use in conveyor belts for underground mining, such non-halogenated rubber compound being fire-resistant in accordance with MSHA standards and further producing acceptable levels of toxicity and smoke upon burning.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A fire-resistant conveyor belt comprising:
a first and second outer cover layer situated on the outer opposing surfaces of the conveyor belt, the first and second outer layers defining a non-halogenated rubber compound consisting of aluminum trihydrate, about 10 phr to about 60 phr of a phosphate plasticizer, and a blend of rubber polymers present in a total amount of 100 phr, the blend of rubbery polymers consisting of natural rubber and polybutadiene rubber; wherein the natural rubber is present in the blend at a level which is within the range of about 30 phr to about 70 phr, and wherein the blend of rubbery polymers is void of nitrile-group containing polymers, and
at least one reinforcement layer situated between the first cover layer and the second cover layer, wherein the conveyor belt is fire-resistant, and wherein the at least one reinforcement layer includes outer first and second skim layers on opposing surfaces of the reinforcements layers, the outer first and second skim layers being comprised of the non-halogenated rubber.

2. The fire-resistant conveyor belt of claim 1 wherein the blend of rubbery polymers is void of red phosphorous.

3. The fire-resistant conveyor belt of claim 1 wherein the aluminum trihydrate is present at a level which is within the range of about 30 phr to about 150 phr.

* * * * *